(12) United States Patent
Favaretto

(10) Patent No.: US 8,844,661 B2
(45) Date of Patent: Sep. 30, 2014

(54) ROAD VEHICLE WITH AN OPERATING DEVICE HOUSED INSIDE A DOOR SILL OF THE FRAME

(71) Applicant: Ferrari S.p.A., Modena (IT)

(72) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/894,653

(22) Filed: May 15, 2013

(65) Prior Publication Data

US 2013/0306266 A1 Nov. 21, 2013

(30) Foreign Application Priority Data

May 16, 2012 (IT) .............................. BO2012A0270

(51) Int. Cl.
*B60K 11/04* (2006.01)
*B62D 25/02* (2006.01)
*B62D 25/20* (2006.01)
*F01M 5/00* (2006.01)

(52) U.S. Cl.
CPC ............. *F01M 5/002* (2013.01); *B62D 25/025* (2013.01); *B62D 25/2009* (2013.01)
USPC ........................................ 180/68.4; 180/68.5

(58) Field of Classification Search
CPC ........ B60K 11/04; B60K 13/02; B60K 11/06; B60K 11/08
USPC .................... 180/68.5, 65.31, 68.3, 68.4, 65.1
See application file for complete search history.

(56) References Cited

U.S. PATENT DOCUMENTS

| | | | | |
|---|---|---|---|---|
| 5,501,289 A | * | 3/1996 | Nishikawa et al. | 180/68.5 |
| 6,085,854 A | * | 7/2000 | Nishikawa | 180/68.5 |
| 7,048,321 B2 | * | 5/2006 | Bandoh et al. | 180/68.5 |
| 7,896,115 B2 | * | 3/2011 | Ono et al. | 180/65.31 |
| 7,918,489 B2 | * | 4/2011 | Oku et al. | 296/68.1 |
| 8,397,853 B2 | * | 3/2013 | Stefani et al. | 180/68.5 |
| 8,561,743 B2 | * | 10/2013 | Iwasa et al. | 180/68.5 |
| 8,596,685 B2 | * | 12/2013 | Mauduit et al. | 280/781 |
| 2012/0018238 A1 | * | 1/2012 | Mizoguchi et al. | 180/68.5 |

FOREIGN PATENT DOCUMENTS

| | | |
|---|---|---|
| DE | 19963068 A1 | 6/2001 |
| DE | 10224884 A1 | 12/2003 |
| FR | 2729114 A1 | 7/1996 |

OTHER PUBLICATIONS

"Italian Application Serial No. IT B020120270, Search Report dated Jan. 8, 2013", 6 pgs.

* cited by examiner

*Primary Examiner* — Hau Phan
(74) *Attorney, Agent, or Firm* — Schwegman Lundberg & Woessner, P.A.

(57) ABSTRACT

A road vehicle having: a plurality of operating devices, and a frame comprising two door sills, which are oriented longitudinally, are arranged laterally on opposite sides of the frame, and have an internally hollow tubular shape, so that a seat is defined inside each door sill, in which at least one operating device is arranged inside at least one door sill in the corresponding seat.

16 Claims, 6 Drawing Sheets

ROAD VEHICLE WITH AN OPERATING DEVICE HOUSED INSIDE A DOOR SILL OF THE FRAME

PRIORITY CLAIM AND RELATED APPLICATIONS

This application claims the benefit of priority under 35 U.S.C. Section 119 to Italian Patent Application Serial No. BO2012A 000270, filed on May 16, 2012, which application is incorporated herein by reference in its entirety.

TECHNICAL FIELD

The present invention relates to a road vehicle.

The present invention is advantageously applied in a hybrid road vehicle (i.e. with thermal and electric hybrid propulsion), to which the following disclosure will explicitly refer without however being less general.

BACKGROUND

With respect to a conventional road vehicle, a hybrid road vehicle additionally comprises at least one electrical machine that is mechanically connectable to the driving wheels, an electronic power converter that drives the electrical machine, a system for electric energy that is electrically connected to the electronic power converter, and a system for cooling the electrical machine and/or the electronic power converter. The placement of all these additional elements inside the road vehicle may be very complex, particularly in the event of a high performance sport vehicle that has very small internal spaces. Accordingly, one is often forced to arrange the operating devices of the hybrid road vehicle in positions that are not optimal.

Patent Application DE10224884A1 describes a frame for a road vehicle equipped with two door sills with an internally hollow tubular shape, so that a seat housing a group of electrical batteries is defined inside each door sill. The electrical batteries are axially inserted inside the corresponding door sill through a through aperture obtained in a rear part of the door sill. Nevertheless, once the construction of the road vehicle is complete, the accessibility to the electrical batteries housed inside a door sill is particularly difficult.

OVERVIEW

Examples of the present subject matter are to provide a road vehicle, which is free from the above-described drawbacks and at the same time is easy and affordable to embody.

According to the present subject matter, a road vehicle is provided according to that claimed by the accompanying claims.

BRIEF DESCRIPTION OF THE DRAWINGS

The present invention shall now be described with reference to the accompanying drawings, which illustrate several non-limiting embodiment examples thereof, in that.

DETAILED DESCRIPTION

Figure 1:
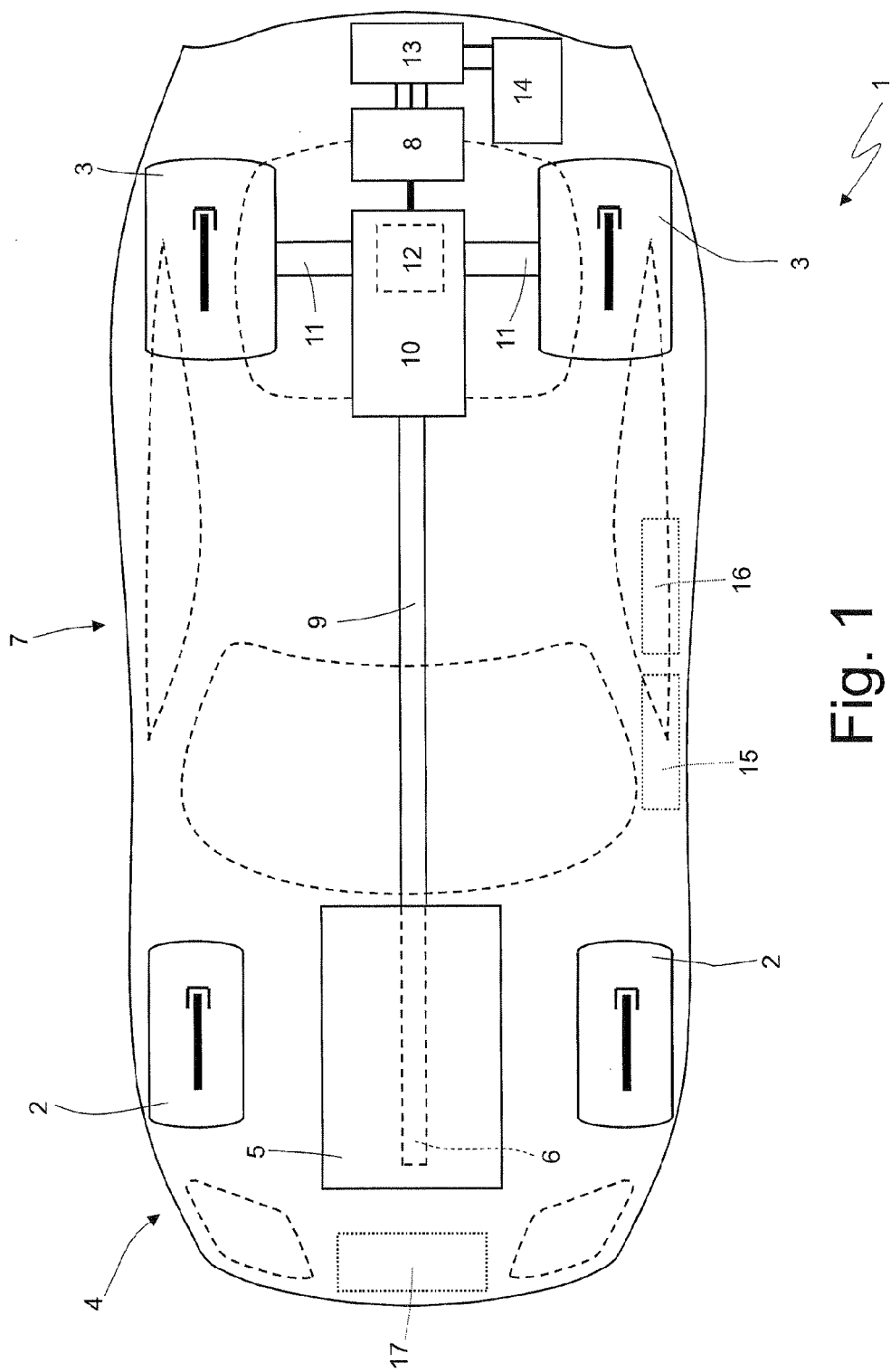
FIG. 1 is a diagrammatic and top view of a road vehicle with hybrid propulsion provided in accordance with the present subject matter.

Numeral 1 in FIG. 1 indicates a road vehicle as a whole, with hybrid propulsion equipped with two front wheels 2 and two rear driving wheels 3, which receive the torque from a hybrid motor propulsion system 4.

The hybrid motor propulsion system 4 comprises an internal combustion heat engine 5, which is arranged in forward position and is equipped with a drive shaft 6, an automatic transmission 7, which transmits the torque generated by the internal-combustion engine 5 to the rear driving wheels 3, and an electrical machine 8 which is mechanically connected to transmission 7 and is reversible (i.e. may operate both as an electric engine by absorbing electric energy and generating a mechanical torque, and as an electric generator by absorbing mechanical energy and generating electric energy).

Transmission 7 comprises a transmission shaft 9 which on the one hand is angularly integral with the drive shaft 6 and on the other hand is mechanically connected to a double-clutch gearbox 10, which is arranged in rear position and transmits the motion to the rear driving wheels 3 by means of two axle shafts 11 which receive the motion from a differential 12. The electrical machine 8 is mechanically connected to gearbox 10 and in particular, is angularly integral with a primary shaft of gearbox 10; refer, for example to the description in Patent Application EP2325034A1 for the modalities on connecting the electrical machine 8 to the double-clutch gearbox 10. The electrical machine 8 is controlled by a bidirectional electronic power converter 13 which is connected to an electric energy storage system 14.

The double-clutch gearbox 10 is equipped with an oil lubrication and cooling circuit that carries out the continuous flow of oil inside the double-clutch gearbox 10 both to lubricate the bearings, gears and clutches and to remove the excess heat. The oil lubrication and cooling circuit of the double-clutch gearbox 10 comprises a water-oil heat exchanger 15, in which the oil of the double-clutch gearbox 10 cools down by giving part of its heat to a cooling fluid (typically consisting of a mixture of demineralized water and antifreeze additive).

Similarly, the electrical machine 8 is equipped with an oil lubrication and cooling circuit that carries out the continuous flow of oil inside the electrical machine 8 both to lubricate the gears and the bearings and to remove the excess heat. The oil lubrication and cooling circuit of the electrical machine 8 comprises a water-oil heat exchanger 16, in which the oil of the electrical machine 8 cools down by giving part of its heat to a cooling fluid (typically consisting of a mixture of demineralized water and antifreeze additive).

The water-oil heat exchanger 15 of the double-clutch gearbox 10 and the water-oil heat exchanger 16 of the electrical machine 8 are arranged close to each other and use the same cooling fluid; from a hydraulic point of view (i.e. from the point of view of the cooling fluid), the two water-oil heat exchangers 15 and 16 may be indifferently parallel connected to each other or in series.

The road vehicle 1 comprises a cooling circuit, which allows the cooling fluid to flow (typically by means of at least one circulation pump) through the two water-oil heat exchangers 15 and 16, in which the cooling fluid heats up by absorbing part of the heat of the oil, and through a radiator 17 (i.e. a water-air heat exchanger), in which the cooling fluid cools down by giving part of its heat to the outer environment. Typically, radiator 17 is arranged in forward position so as to be directly struck by the air during the advancing of the road vehicle 1.

Figure 2:
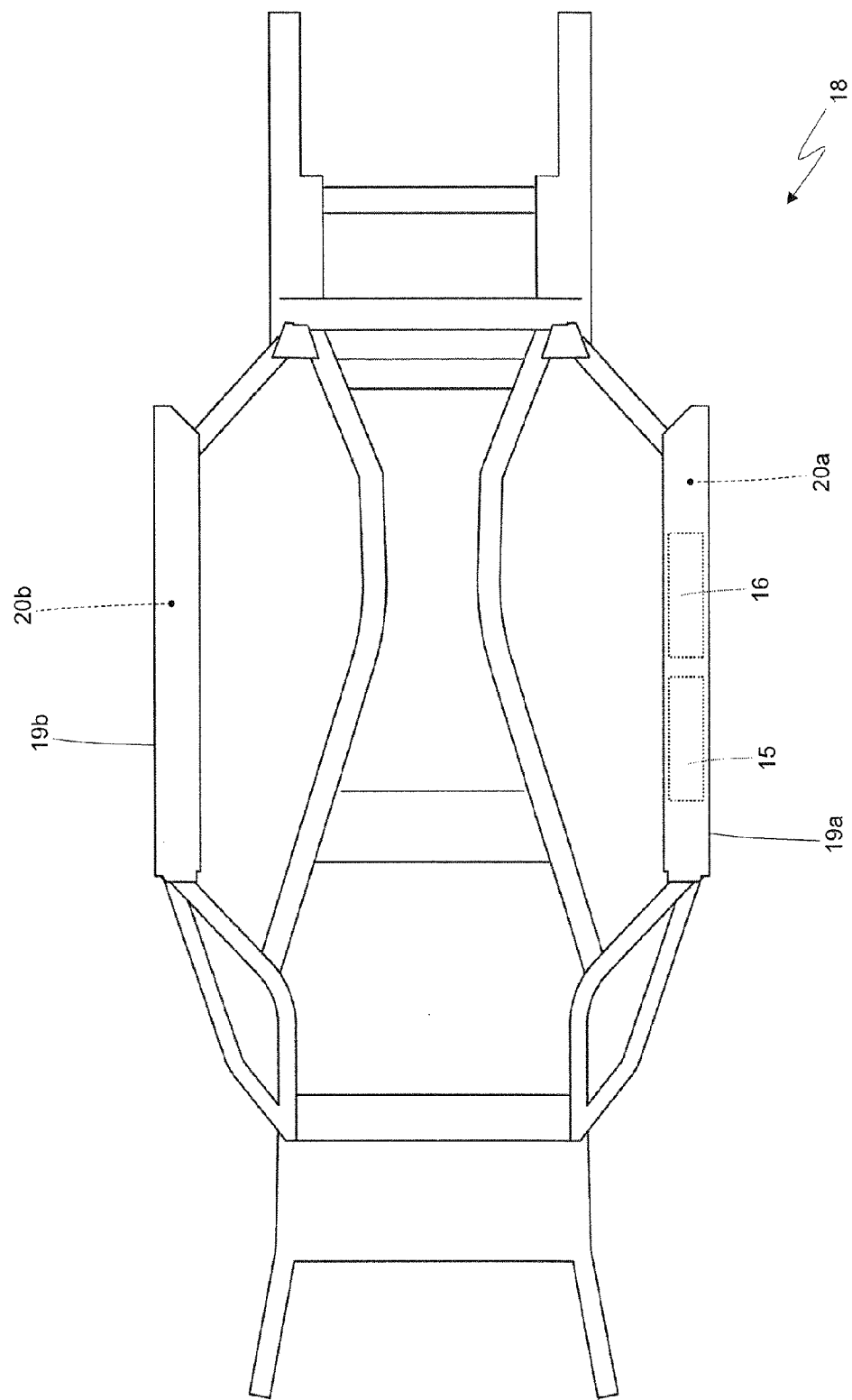
FIG. 2 is a diagrammatic and top view of a frame of the road vehicle in FIG. 1.

As shown in FIG. 2, the road vehicle 1 is equipped with a frame 18 comprising a series of parts (typically metallic) which are connected to each other by means of soldering and/or screws. In particular, frame 18 comprises two door sills 19a and 19b that are longitudinally oriented and are arranged laterally on the opposite sides of frame 18 (i.e. one door sill 19b is arranged to the right of frame 18 while the other door sill 19a is arranged to the left of frame 18) between the front axle and the rear axle; in other words, each door sill 19a or 19b makes up the lower part of the subsill and extends from the end of the front wheelhouse arch up to the beginning of the rear wheelhouse arch. Each door sill 19a or 19b has an internally hollow (empty) tubular shape, so that a seat 20a or 20b is defined inside each door sill 19a or 19b.

Figure 3:
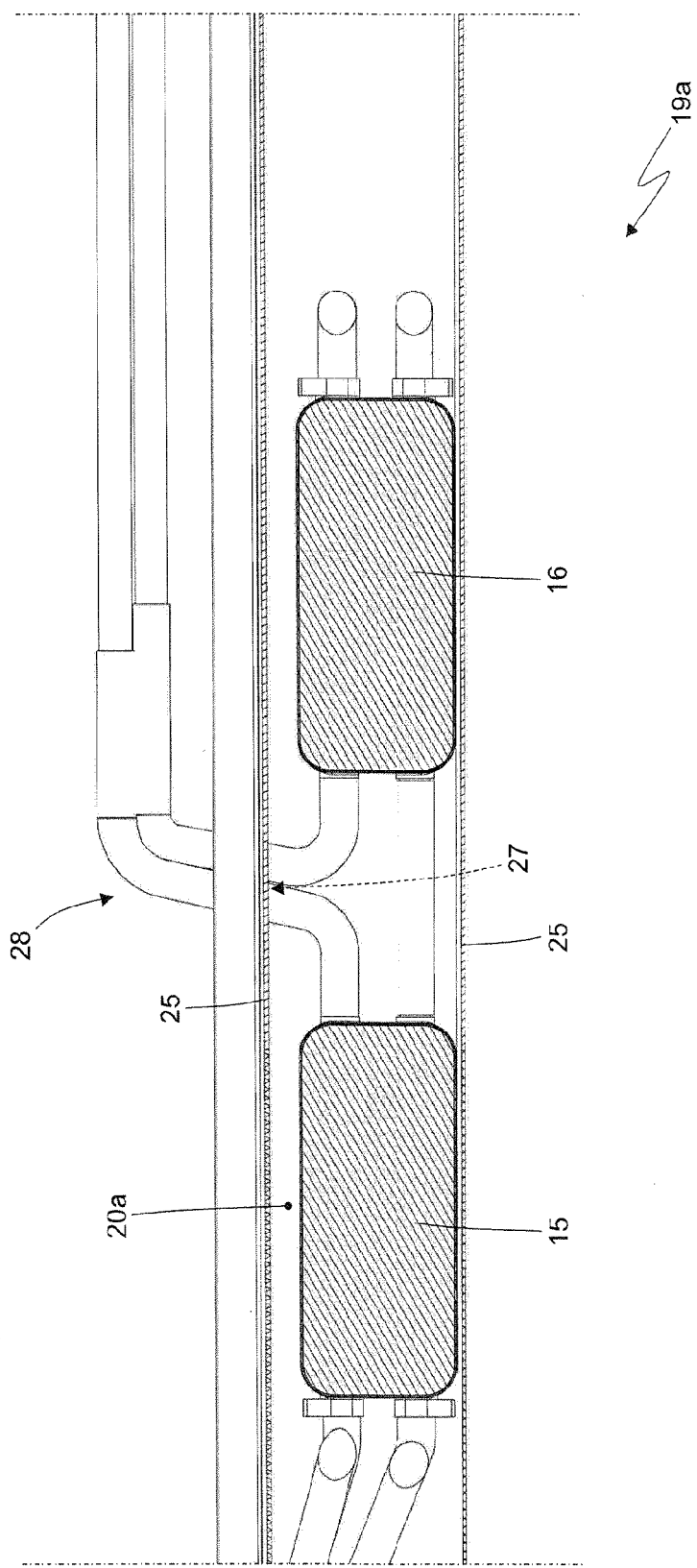
FIG. 3 is a diagrammatic cross-sectioned horizontal view with parts removed for clarity, of a part of door sill of the frame in FIG. 2.
Figure 4:
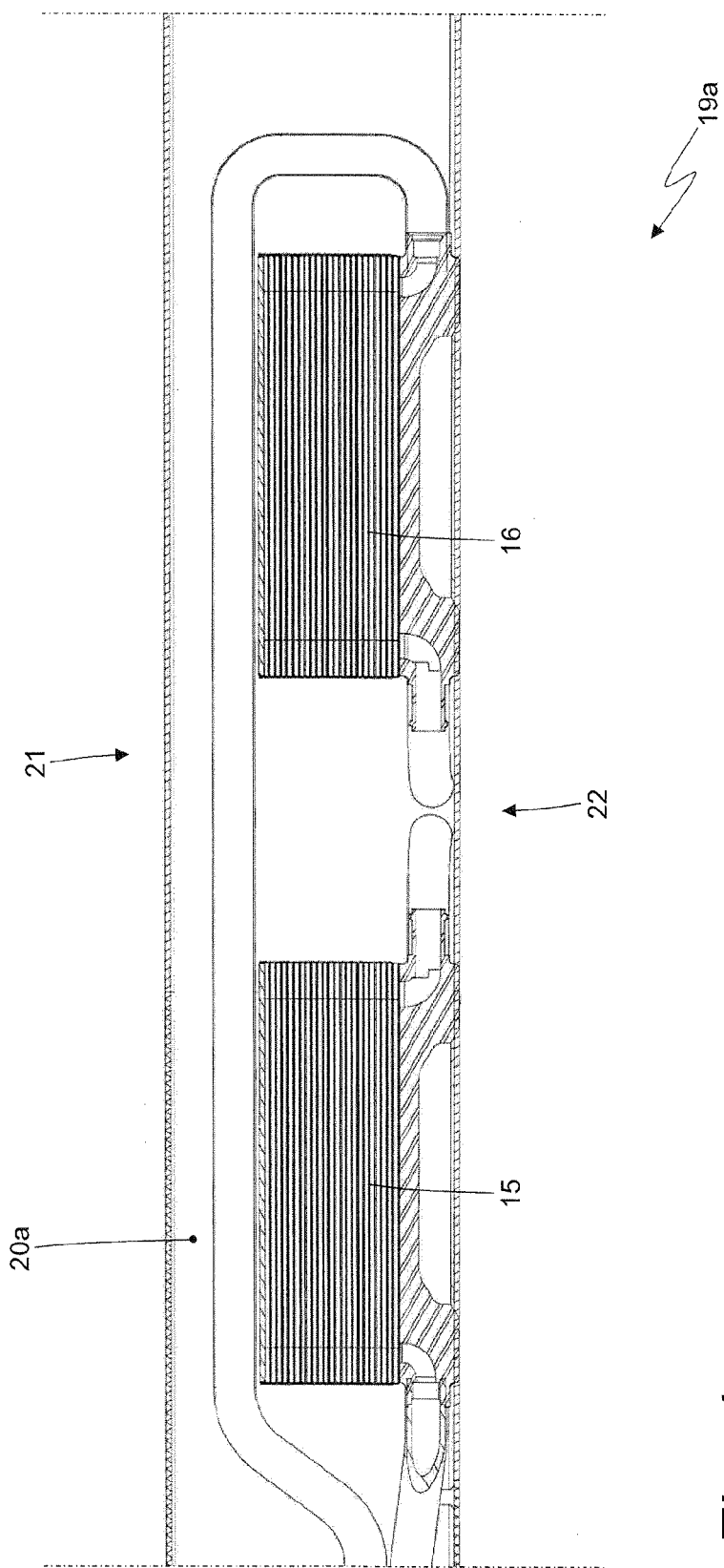
FIG. 4 is a diagrammatic longitudinal sectional view with parts removed for clarity, of a part of door sill in FIG. 4.

As shown in FIGS. 2, 3 and 4, the two water-oil heat exchangers 15 and 16 (which make up two operating devices of the road vehicle 1) are arranged inside the door sill 19a in the corresponding seat 20a; in other words, the two water-oil heat exchangers 15 and 16 are arranged in a row (i.e. one after the other) in the inner volume of the door sill 19a.

Figure 5:
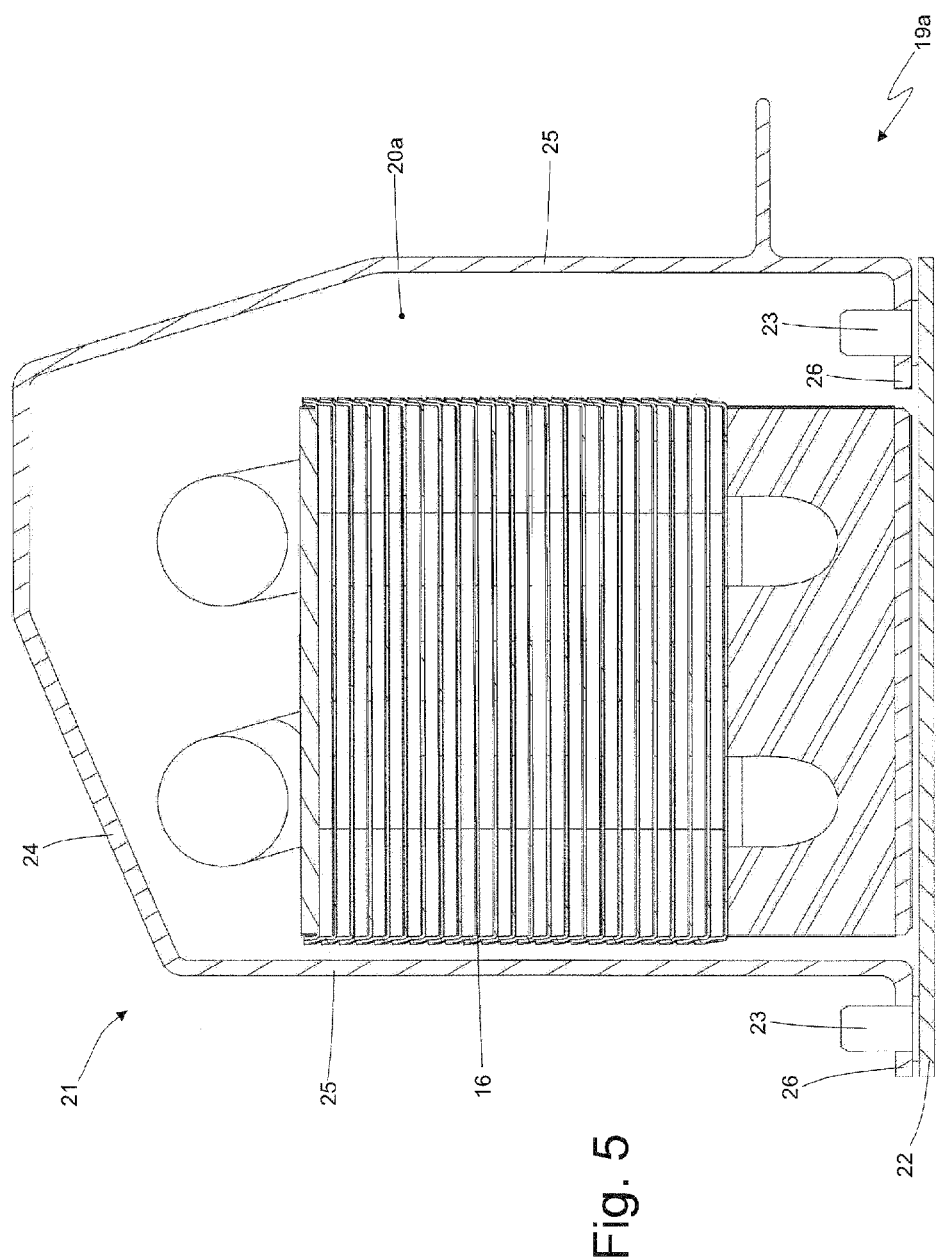
FIG. 5 is a diagrammatic cross-sectioned view with parts removed for clarity, of door sill in FIG. 4.

As shown in FIG. 5, the door sill 19a is made up of an upper fixed part 21 which has the shape of an upside-down "U" and is mechanically connected to the other parts of frame 18, and a lower movable part 22 which is flat, is arranged horizontally, is mechanically connected to the upper fixed part 21 in a separable manner and supports the two water-oil heat exchangers 15 and 16 (i.e. the two water-oil heat exchangers 15 and 16 are only mechanically supported by the lower movable part 22 of the door sill 19a and have no contact/connection point with the upper fixed part 21 of the door sill 19a). It is worth noting that only the upper fixed part 21 of the door sill 19a is mechanically connected to the other parts of frame 18, while the lower movable part 22 of the door sill 19a is completely independent of (untied) the other parts of frame 18 and hence may come uncoupled and hence be disassembled also in the finished road vehicle 1.

According to an embodiment, in the door sill 19a, the lower movable part 22 is screwed into the upper fixed part 21 by means of a plurality of screws 23 inserted from the bottom (i.e. with the head facing downwards so as to be accessible from the bottom of the road vehicle 1).

The upper fixed part 21 of the door sill 19a is shaped as an upside-down "U" and has a substantially horizontal upper wall 24 and two vertical lateral walls 25, which are arranged on opposite sides of the upper wall 24. Each lateral wall 25 of the upper fixed part 21 of the door sill 19a ends with a horizontal flange 26, which is arranged perpendicular to the lateral wall 25, rests on the lower movable part 22 of the door sill 19a, and is crossed by the screws 23. The two flanges 26 may be indifferently facing the inside or the outside of the door sill 19a; in the embodiment shown in FIG. 5, the right flange 26 is facing the inside of the door sill 19a, while the left flange 26 is facing the outside of the door sill 19a.

As shown in FIG. 3, an inner lateral wall 25 of the upper fixed part 21 of the first door sill 19a (i.e. the lateral wall 25 facing the inside of the road vehicle 1) has two through holes 27 (only one of which is diagrammatically illustrated in FIG. 3); each through hole 27 is shaped as an upside-down "U", has a lower mouth, which is closed by the lower movable part 22 of the door sill 19a, and is crossed by at least one connection element 28 of the water-oil heat exchangers 15 and 16 inside the door sill 19a (i.e. of the operating devices housed inside the door sill 19a). The front through hole 27 (not shown in FIG. 3) is crossed by two pipes that connect the water-oil heat exchangers 15 and 16 with radiator 17 and make up the delivery and return of the cooling fluid towards radiator 17; in other words, the connection element 28 arranged through the front through hole is made up of two cooling fluid pipes. The rear through hole 27 (shown in FIG. 3) is crossed by four pipes (joined to each other two-by-two in two corresponding wrapping sheaths); the two pipes (delivery and return, respectively) connect the water-oil heat exchanger 15 with the double-clutch gearbox 10 while the other two pipes (delivery and return, respectively) connect the water-oil heat exchanger 16 with the electrical machine 8; in other words, the connection element 28 arranged through the rear through hole 27 is made up of four oil pipes.

It is worth nothing that the relevant flange 26 at each through hole 27 is interrupted to allow the connection elements 28 to be vertically inserted/removed together with the lower movable part 22 of the door sill 19a that supports the water-oil heat exchangers 15 and 16.

As shown in FIGS. 3 and 4, connection pipes of the cooling fluid are also arranged inside the door sill 19a, which hydraulically connect the two water-oil heat exchangers 15 and 16 to each other in series or parallel. In other words, the two water-oil heat exchangers 15 and 16 may be hydraulically connected in series and hence a same cooling fluid first crosses one water-oil heat exchanger 15 or 16 and then the other water-oil heat exchanger 15 or 16; alternatively, the two water-oil heat exchangers 15 and 16 may be hydraulically parallel connected and hence the cooling fluid is divided into two flows, each of which crosses a single water-oil heat exchanger 15 or 16.

From a structural point of view, the lower movable part 22 of the door sill 19a is the most mechanically stressed zone of the door sill 19a (i.e. the mechanical efforts that the door sill 19a is subjected to are concentrated in the lower movable part 22); accordingly, it is possible to make the lower movable part 22 of the door sill 19a in a different and more resistant material (that is having better resistance-weight ratio) with respect to the material making up the upper fixed part 21 of the door sill 19a (among other things, the lower movable part 22 of the door sill 19a is completely flat and hence has a very simple shape that lends itself to being made easily, even with "unconventional" materials). For example, the lower movable part 22 of the door sill 19a could be made of composite material (typically carbon fibre or similar), while the upper fixed part 21 of the door sill 19a could be made of extruded aluminium.

In the embodiment shown in FIG. 2, the two door sills 19a and 19b may be identical to each other (i.e. both be made up of an upper fixed part 21 screwed into a lower movable part 22) by symmetry (i.e. to have frame 18 perfectly longitudinally symmetrical) and also standardized if the door sill 19b is not used to house the operating devices of the road vehicle 1. Alternatively, the two door sills 19a could be different from each other, i.e. only the door sill 19a is made up of an upper fixed part 21 screwed into a lower movable part 22 to allow the insertion therein of operating devices of the road vehicle 1, while the door sill 19b is made up of a single extruded tubular without screwed parts (and therefore which may be disassembled).

Figure 6:
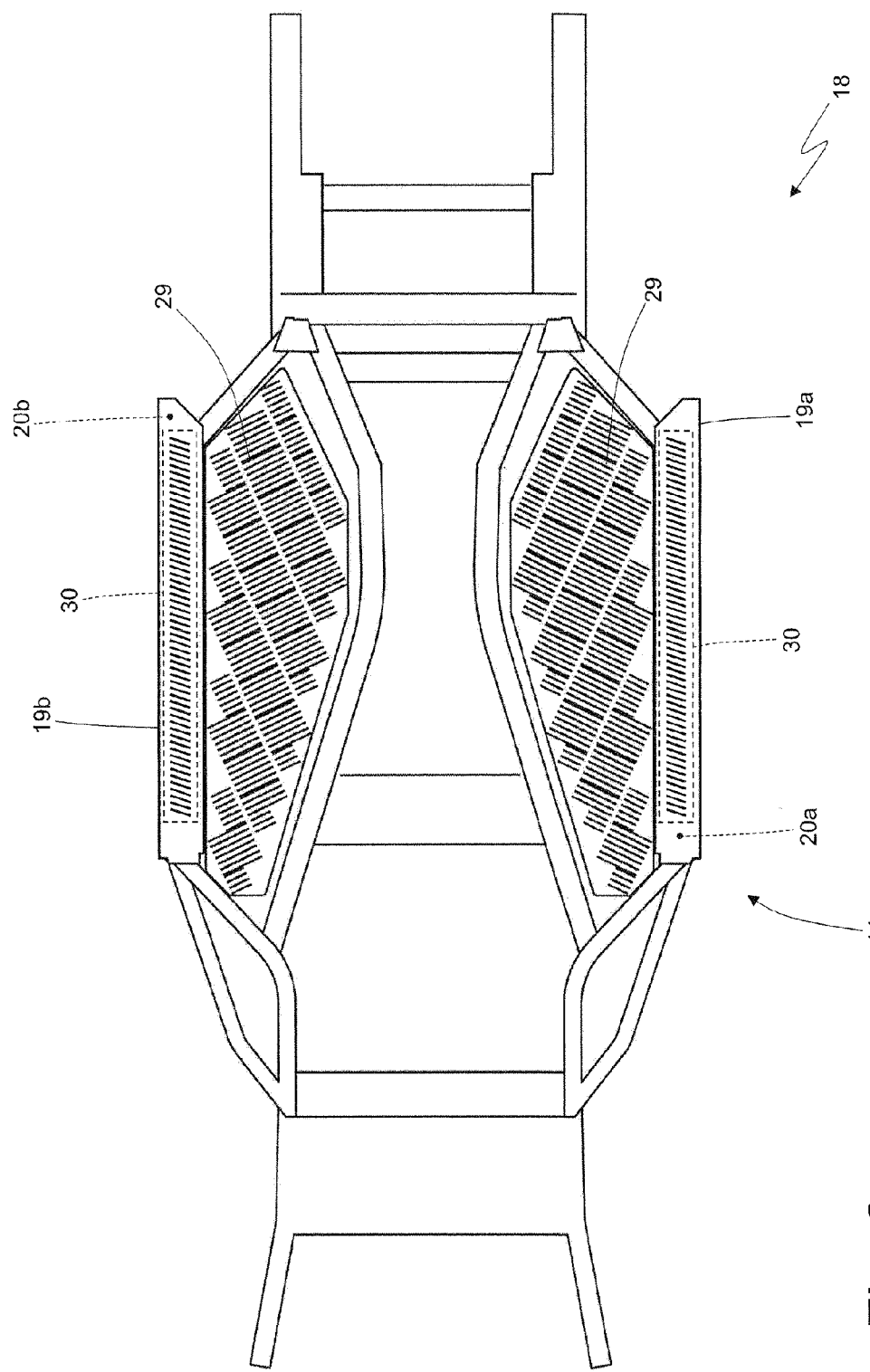
FIG. 6 is a diagrammatic and top view of a frame of the road vehicle in FIG. 1, in accordance with an alternative embodiment.

According to the embodiment shown in FIG. 6, the storage system 14 comprises four battery packs 29 and 30, which are parallel connected to each other and in series and comprise respective electrochemical cells that are adapted to convert the chemical energy stored into electric energy and vice versa.

The two battery packs 29 have a flattened (or "sole-like") shape, that is horizontally have an increased extension combined with a modest thickness; each battery pack 29 is arranged in a corresponding housing that is obtained between the elements of frame 18 and is bottomly delimited by a surface that is integral with frame 18 and makes up a bottom wall of the passenger compartment (in other words, each battery pack 29 rests directly on the surface). The two battery packs 30 are "cigar-shaped", i.e. they have a transverse section tending to be square shaped combined with a longitudinal length that is significantly greater than the transverse section; each battery pack 30 (which makes up an operating device of the road vehicle 1) is arranged inside a door sill 19a or 19b in the corresponding seat 20a or 20b.

In the embodiment shown in FIG. 6, only the battery packs 30 of the storage system 14 (that is the two water-oil heat exchangers 15 and 16 are arranged outside the door sills 19a and 19b) are arranged outside the door sills 19a and 19b. In a different embodiment not shown, both the water-oil heat exchangers 15 and 16 and a battery pack 30 (obviously smaller with respect to the battery pack 30 which is arranged inside the door sill 19b) are arranged inside the door sill 19a. In a further embodiment not shown, only the water-oil heat exchangers 15 and 16 are arranged inside the door sill 19a, and the storage system 14 comprises a single battery pack 30 which is arranged inside the door sill 19b.

Obviously, in the embodiment shown in FIG. 6, the two door sills 19a and 19b are identical to each other (i.e. both are made up of an upper fixed part 21 screwed into a lower movable part 22) because they are both used to house the operating devices of the road vehicle 1. Furthermore, in the embodiment shown in FIG. 6, the connection elements 28 are made up of electrical wires (which cross through corresponding through holes 27).

The above-described road vehicle 1 has numerous advantages.

Firstly, the above-described road vehicle 1 allows a space normally not used made up of the inner volume of the two door sills 19a and 19b to be taken advantage of in an optimal manner; indeed, in the above-described road vehicle 1 the inner volume of the two door sills 19a and 19b is used to house the water-oil heat exchangers 15 and 16 and/or battery packs 30 of the storage system 14. To this end, it is worth noting that these operating devices (i.e. the water-oil heat exchangers 15 and 16 and the battery packs 30) have both ideal dimensions (i.e. compatible) with the inner volume of the two door sills 19a and 19b and at the same time, require hydraulic or electrical (the connection elements 28) connections with a smaller cross section and extremely flexible shape that may be made to cross the inner lateral walls 25 of the door sills 19a and 19b (obviously through the corresponding through holes 27 of the inner side walls 25) without difficulty.

Furthermore, the door sills 19a and 19b in the above-described road vehicle 1 may have a larger transverse section (that is larger than standard) to increase the inner volume of the door sills 19a and 19b, that is to increase the capacity of the seats 20a and 20b. The oversize of the transverse section of the door sills 19a and 19b is in any event advantageous, because it allows the thickness of the material making up the door sills 19a and 19b to be decreased, thus promoting the use of a material that is lighter than steel (such as aluminium or composite materials). In other words, when designing frame 18 in materials that are lighter than steel, often the designer is to make the door sills 19a and 19b with a smaller transverse section than what is optimal from a structural point of view, to limit the overall volume of the door sills 19a and 19b; instead, the presence in the present subject matter of "voluminous" door sills 19a and 19b is not a problem, because the inner volume of the door sills 19a and 19b is not lost, rather is used in any event to house the operating devices.

In any event, complete accessibility to the operating devices arranged inside the door sills 19a and 19b is ensured in the above-described road vehicle 1, because once the road vehicle 1 is lifted, it is sufficient to remove the screws 23 of one door sill 19a or 19b in order to remove, from the bottom, the lower movable part 22 of the door sill 19a or 19b on which the corresponding operating devices are resting. It is in any event worthy to note that the operating devices that are housed inside the door sills 19a and 19b (i.e. the water-oil heat exchangers 15 and 16 and the battery packs 30) do not normally require any type of maintenance or periodic inspection and hence do not require being arranged in an easily (quickly) accessible position.

The door sills 19a and 19b depict an ideal placement for operating devices even of significant mass (such as the battery packs 30 of the storage system 14) of the road vehicle 1, because they are at a minimum height off the ground (indeed, they depict the lowest point of the road vehicle 1) and hence the masses arranged inside the door sills 19a and 19b contribute to lowering the centre of the road vehicle 1. Furthermore, the door sills 19a and 19b are arranged in a central position and hence the masses arranged inside the door sills 19a and 19b contribute to "centring" the centre of the road vehicle 1. Lastly, by being part of the survival cell of the passenger compartment, the door sills 19a and 19b are in the most protected area (that is less subject to deformations) in case of head-on crash.

Lastly, the above-described road vehicle 1 is affordable and quick to make, because the two parts 21 and 22 of the door sills 19a and 19b have a simple and constant transverse section that also lends itself to being made by extrusion. Furthermore, the operating devices that are housed inside the door sills 19a and 19b (i.e. the water-oil heat exchangers 15 and 16 and the battery packs 30) may be pre-assembled off the line on the lower movable part 22 of the door sill 19a or 19b and hence inserted from the bottom together with the lower movable part 22 only at the end of the assembly of the road vehicle 1.

The invention claimed is:

1. A road vehicle comprising:
    a frame comprising two door sills, which are oriented longitudinally, are arranged laterally on opposite sides of the frame, and have a tubular shape internally hollow, so that a seat is defined inside each door sill; and
    at least one operating device, which is arranged inside at least one first door sill in a corresponding seat;
    wherein the first door sill is made up of a fixed part, which has the shape of a "U" and is mechanically connected to the frame, and of a movable part, which is flat and is mechanically connected to the fixed part in a separable manner.

2. The road vehicle according to claim 1, wherein the fixed part is arranged above the movable part, wherein the moveable part is arranged horizontally and to support the operating device.

3. The road vehicle according to claim 2, wherein, in the first door sill, the movable part is screwed into the fixed part by means of a plurality of screws.

4. The road vehicle according to claim 3, wherein:
    the fixed part of the first door sill is shaped as an upside-down "U" and has an upper wall and two vertical lateral walls, which are arranged on opposite sides of the upper wall; and each lateral wall of the fixed part of the first door sill ends with a horizontal flange, which is arranged perpendicular to the lateral wall, rests on the movable part of the first door sill, and is crossed by the screws.

5. The road vehicle according to claim 2, wherein an inner lateral wall of the fixed part of the first door sill has at least one through hole, which is shaped as an upside-down "U", has a lower mouth, which is closed by the movable part of the first door sill, and is crossed by a connection element of the operating device housed inside the first door sill.

6. The road vehicle according to claim 1, wherein the fixed part of the first door sill is mechanically connected to the other parts of the frame, while the movable part of the first door sill is mechanically completely independent of the other parts of the frame.

7. The road vehicle according to claim 1, wherein the movable part of the first door sill is made up of a different material with respect to the material making up the fixed part of the first door sill.

8. The road vehicle according to claim 1, wherein the operating device is mechanically supported only by the movable part of the first door sill and it has no contact/connection point with the fixed part of the first door sill.

9. The road vehicle according to claim 1, wherein the operating device is a water-oil heat exchanger, in which the oil cools down by transferring part of its heat to a cooling fluid.

10. The road vehicle according to claim 9 and comprising a cooling circuit, which allows the cooling fluid to flow through the water-oil heat exchanger, wherein the cooling fluid is to absorb heat from the oil, and through a radiator, wherein the cooling fluid is to transfer heat to the outer environment.

11. The road vehicle according to claim 9, wherein two water-oil heat exchangers are housed inside the first door sill, which are physically separated from one another and use the same cooling fluid.

12. A road vehicle comprising:
a frame comprising two door sills, which are oriented longitudinally, are arranged laterally on opposite sides of the frame, and have a tubular shape internally hollow, so that a seat is defined inside each door sill; and
at least one operating device, which is arranged inside at least one first door sill in the corresponding seat;
wherein the operating device is a water-oil heat exchanger, wherein the oil is to cool by transferring heat to a cooling fluid.

13. The road vehicle according to claim 12 and comprising a cooling circuit, which allows the cooling fluid to flow through the water-oil heat exchanger, wherein the cooling fluid is to absorb heat from the oil, and through a radiator, wherein the cooling fluid is to transfer heat to the outer environment.

14. The road vehicle according to claim 12 and comprising:
an internal combustion heat engine;
at least two driving wheels, which receive the torque from the internal combustion heat engine; and
a gearbox, which is interposed between the internal combustion heat engine and the driving wheels and uses the oil that is cooled down in the water-oil heat exchanger.

15. The road vehicle according to claim 12 and comprising an electrical machine to use oil cooled in the water-oil heat exchanger.

16. The road vehicle according to claim 12, wherein two water-oil heat exchangers are housed inside the first door sill, which are physically separated from one another and use the same cooling fluid.

* * * * *